SHIFT REGISTER UTILIZING FREE CHARGE CARRIER STORAGE OF CASCADED DELAY NETWORK COUPLED TRANSISTORS

Filed June 12, 1958

INVENTOR
HEINE ANDRIES RODRIGUES DE MIRANDA
BY Frank R. Jifari
AGENT

United States Patent Office 3,047,739
Patented July 31, 1962

3,047,739

SHIFT REGISTER UTILIZING FREE CHARGE CARRIER STORAGE OF CASCADED DELAY NETWORK COUPLED TRANSISTORS

Heine Andries Rodrigues de Miranda, Mollenhutseweg, Nijmegen, Netherlands, assignor to North American Philips Company, Inc., New York, N.Y., a corporation of Delaware Filed June 12, 1958, Ser. No. 741,497
Claims priority, application Netherlands June 13, 1957
13 Claims. (Cl. 307—88.5)

The present invention relates to circuit arrangements comprising junction transistors of the so-called "deep-etched" type according to patent application Serial No. 679,288, filed August 20, 1957, acting as electric storage elements. It concerns in particular an improvement of a circuit arrangement described and shown in said application.

The patent application Serial No. 679,288 concerns junction transistors comprising a body, in which a contact-comprising semi-conductive part of a given conductivity type, termed the base, is separated by closely opposite junctions from at least two contact-comprising semi-conductive parts of opposite conductivity type, termed the emitter-zone and the collector zone respectively. The junction transistor according to this patent application has the feature that, issuing from a boundary surface of the body adjacent the emitter-contact, a non-conductive part penetrates into the base, which part locally narrows the current path from the emitter-contact to the base-contact and approaches the collector to a distance smaller than the minimum distance from the emitter to the collector; the arrangement results in the production of a negative differential resistance in the characteristic representing the relationship of the collector-current and of the voltage difference in the blocking direction between the collector-contact and the base-contact at a constant voltage difference in the forward direction between the emitter-contact and the base-contact.

In the hitherto most currently employed embodiment of this transistor, the non-conductive part is constituted by an incision usually obtained by subjecting the assembly, after providing at least the emitter-zone and the emitter-contact on the base, to an electrolytic etching treatment with the use of an etchant forming a low-ohmic transition with the material of the emitter-zone and a high-ohmic transition with the material of the base-zone, the emitter-contact being used as an electrode, and a part of the emitter-zone and a contiguous layer of the base being etched away, whence the term "deep-etched" junction transistor.

A circuit arrangement described in the prior patent application comprises at least one "deep-etched" junction transistor, in which such a high voltage difference occurs temporarily across the collector-depletion layer, that the current path from the emitter to the base-contact is at least partially cut off. This cut-off occurs at a given so-called "cut-off" value of the voltage applied between the collector-electrode and the base-electrode. In the embodiment of said circuit arrangement specifically described in the prior application, at least one "deep-etched" junction transistor functions as an electric storage element, its collector supply voltage being a control pulse, the amplitude of which exceeds its collector-base cut-off voltage, so that its active base-zone is at a floating potential during this control pulse. An erase pulse following the control pulse and having an amplitude smaller than the cut-off voltage is used to consume any free charges in the base-zone and may be combined together with the control pulse to form a stepped or saw-tooth pulse.

The aforesaid embodiment described and shown in the prior patent application comprises a cascade of deep-etched transistors, which act as electric storage elements, and employs two sources of clock-pulses set off in time with respect to one another, said sources delivering the so-called control pulses. In this circuit arrangement, information registered in the form of free charges in the base-zone of a first transistor, is shifted to a next transistor at each clock-pulse, so that two transistors are required to store the information during the time interval between two successive clock-pulses from one of the sources.

The circuit arrangement according to the present invention takes advantage of the fact that, at a voltage equal to or exceeding the so-called cut-off value of the collector-base voltage, not only the collector-current, but also the base-current corresponding to a given forward base-emitter voltage is greatly reduced. This circuit arrangement comprises a series of at least two "deep-etched" junction transistors, the emitter of each transistor of the series being connected to a point of constant potential through a load impedance. It has the feature that the base of a next transistor of the series is coupled to the emitter of the preceding transistor through a delaying network, while the collectors of all the transistors are simultaneously supplied from the same source of voltage pulses so that, as a result of a current pulse produced during a voltage pulse through the load impedance of a preceding transistor of the series, electrical energy is stored in the corresponding delaying network, which energy produces a considerable number of free charge carriers in the base-zone of the next transistor of the series only after termination of this voltage pulse.

In order that the invention may be readily carried into effect, one embodiment thereof will now be described in detail, by way of example with reference to the accompanying drawing, in which FIG. 1 is a schematic sectional view of one embodiment of a "deep-etched" junction transistor, and shows a suggested symbol for a transistor of this type.

Figure 1:
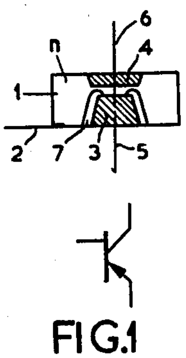

As shown in FIG. 1, a "deep-etched" junction transistor is made up of a plate 1 of semi-conductive material such as germanium or silicon, for example of n-type carrying a base electrode 2 which is conductive in both directions, an emitter 3 and a collector 4 being formed by alloying the material of the plate. Consequently, both the emitter 3 and the collector 4 are zones of a material of opposite conductivity type, for example p-type. Each of these zones has connected to it an electrode 5 and 6 respectively, for example by soldering. From the boundary surface of the plate adjacent the emitter-contact, a non-conductive part 7 penetrates into the base. This non-conductive part is an incision extending about the emitter-contact and formed by etching. As a result the current path from the emitter to the base contact is locally narrowed, because the non-conductive part 7 approaches the collector to a distance shorter than the minimum distance between the emitter and the collector. The base-contact 2 is consequently separated from the emitter by the non-conductive part 7 on the one hand and by the collector 4 on the other hand, which is indicated by the symbol shown in FIG. 1.

Figure 2:
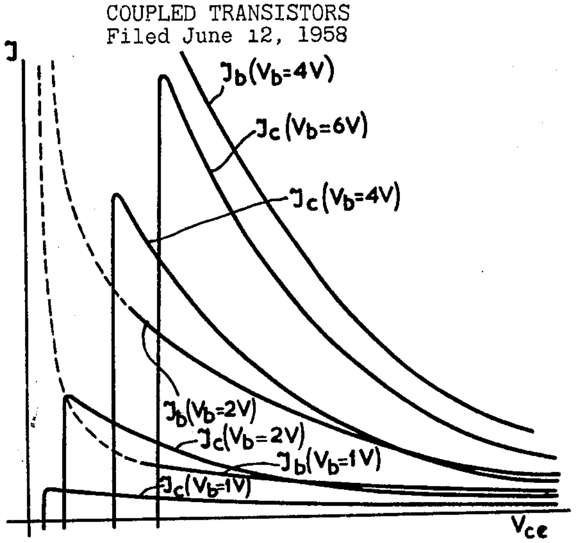
FIG. 2 shows a group of base- and collector current-collector emitter voltage characteristics of a transistor of the type represented in FIG. 1, with the emitter-base voltage as a parameter.

FIG. 2 shows the collector-current $I_c$ and the base-current $I_b$ of a transistor shown in FIG. 1 as a function of the collector-emitter voltage $V_{ce}$. Above a given value of the collector-emitter voltage both the collector-current and the base-curent decrease with increasing voltage.

Hence, the transistor has an output characteristic with a negative resistance part and, above a so-called "cut-off value" of the collector-emitter voltage both the base-current and the collector-current are comparatively low. This permits a delaying network to be connected between two successive transistors of a series of transistor and electric energy to be stored in this network as long as a voltage is applied between the collector- and the emitter-electrodes of the transistors.

Figure 3:
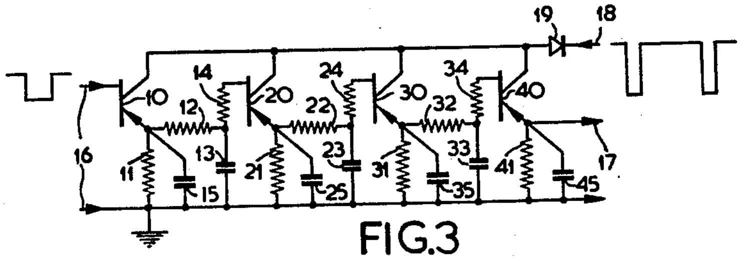
FIG. 3 shows the wiring diagram of one embodiment of the circuit arrangement according to the invention.

One form of the circuit arrangement according to the invention is shown in FIG. 3. This form comprises a series of four cascade-connected "deep-etched" transistors 10, 20, 30 and 40 the collectors of which are supplied through a diode 19 with negative clock-pulses from a source 18. The emitter of each transistor is grounded through load resistors 11, 21 and so on respectively and is coupled to the base of the next transistor through a delay network made up of series-resistors 12, 22 and so on respectively and parallel-capacitors 13, 23 and so on respectively. The emitter of the last transistor 40 is connected to the output terminals 17 of the circuit arrangement, while the base of the first transistor 10 is connected to a source 16 of negative input pulses. If need be, depending upon the repetition frequency of the clock-pulses, low-ohmic resistors 14 and so on may be connected in the base-connections of the transistors 20, 30 and 40, while parallel capacitors 15 and so on of small value may be connected in parallel with the load resistors 11 and so on depending upon the width of these pulses.

Figure 4:
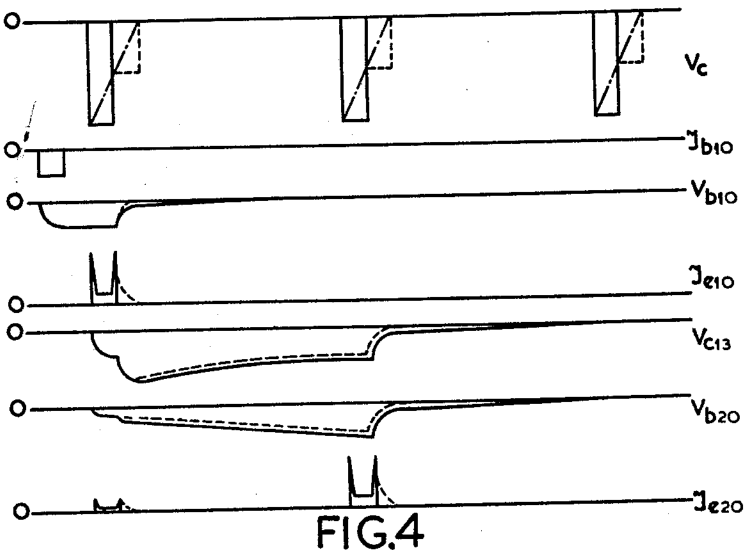
FIG. 4 shows current- and voltage-time diagrams for explaining the operation of this embodiment.

FIG. 4 illustrates the operation of the circuit arrangement shown in FIG. 3. The first line represents the clock-pulses V*c*, which may if desired, be stepped pulses or saw-tooth pulses, as indicated in dash-lines and in dot-and-dash lines respectively. The second line of FIG. 4 shows an input pulse I*b*10 which is supplied from the source 16 to the base of the transistor 10. When this pulse arrives, there is no voltage in the emitter-collector-circuit of the transistor 10, so that no current passes through this circuit and the input pulse can only produce free charge carriers in the base-zone of the transistor 10. This charge V*b*10 of the base-zone, however, cannot leak away and subsists till the arrival of the next clock-pulse V*c*, as shown in the third line of FIG. 4. This clock-pulse has a steep leading edge and an amplitude exceeding or equal to the "cutoff value" of the collector-emitter voltage of the transistors 10 to 40. Owing to the presence of free charge carriers in the base of the transistor 10, the clock-pulse V*c* produces a current pulse I*e*10 through its emitter-collector circuit. After an initial high current peak, this current pulse is very rapidly limited to the so-called "cut-off value," and the free charge carriers in the base-zone are only temporarily allowed to leak away to a small extent. At the end of the clock-pulse, the collector-emitter voltage decreases abruptly, so that a second short emitter-current pulse of greater amplitude is produced, accompanied by a partial discharge of the base-zone of the transistor 10. Subsequently, this base-zone becomes discharged more or less rapidly, dependent upon the form of the clock-pulses. If, for example, the trailing edges of the clock-pulses are slightly less steep than their leading edges, the base-zone becomes comparatively rapidly discharged during the end of the clock-pulses, subsequent to which it becomes slowly further discharged. If the clock-pulse is followed by a stepped erase pulse haivng an amplitude smaller than the "cut-off value" of the collector-emitter voltage, as indicated in dash-lines in the first line of FIG. 4, the base-zone is allowed to discharge completely during said erase pulse, as indicated in dash lines in the third and fourth lines of FIG. 4.

The capactor 13 becomes charged to a voltage V*c*13 via the resistor 12 by the current pulse through the resistor 11, as shown in the fifth line of FIG. 4. After the clock-pulse, this capacitor slowly discharges through resistors 11 and 12 and into the base-zone of transistor 20 through resistor 14, as the case may be, the base-zone of this transistor consequently receiving a charge V*b*20 of free charge carriers, as shown in the sixth line of FIG. 4. Owing to the time constant of the delaying network 12, 13 the charge of the base-zone of the transistor 20 during the first clock-pulse is as yet insufficient to produce a noticeable current pulse through its emitter-collector circuit. As a result of the capacitor 13 discharging into the base-zone of the transistor 20, the number of free charge carriers in this zone during the next clock-pulse has, however, become such that the second clock-pulse produces a comparatively strong current pulse I*e*20 through the emitter-collector circuit of the transistor 20, as shown in the last line of FIG. 4.

Similarly as the third and fourth lines of FIG. 4, the last three lines of this figure also show in dash lines the variation of the several currents and voltages when using step clock pulses. The emitter-current of each transistor subsists during the second part of the corresponding clock-pulse but decreases gradually due to the base-zone of this transistor becoming discharged.

The discharge of the base-zones of the various transistors between the clock-pulses V*c* by a forward leakage current of the corresponding base-collector-diodes is prevented by the rectifier 19.

The sharp peaks of the emitter-current pulses are strongly damped by the emitter-capacity of the corresponding transistor, so that the form represented in the fourth and last lines of FIG. 4 does not correspond to reality. Yet it may happen, for example in the case of comparatively long clock-pulses that the emitter-current pulses actually have two comparatively sharp peaks. This may be undesirable and is avoided by means of a small capacitor 15, 25, and so on, which capacitor increases the natural emitter-capacity of the corresponding transistors 10, 20 and so on. The time constant of the load circuit made up of the resistors 11, 21 and so on and the parallel-capacitors 15, 25 and so on, which at least partly consist of the natural emitter-capacity of the transistor 10, 20 and so on, should be of the order of the duration of the clock-pulses.

The capacitors 13, 23 and so on should be capable of becoming rapidly charged by way of the resistors 12, 22 and so on and of becoming comparatively slowly discharged through resistors 11 and 21, 21 and 22, and so on. Hence, the value of resistors 12, 22 and so on should be much lower than that of the load resistors 11, 21 and so on. On the other hand, the delay with which the base-zone of the next transistor 20, 30 and so on becomes charged should exceed the width of the clock-pulses, since otherwise the input pulse applied to the base of the transistor 10 by the first clock-pulse is transmitted even beyond the base of the last transistor 40. The time constant of the circuit made up of the natural capacity of the base of the transistors 20, 30 and so on of the series-resistors 14, 24 and so on connected between this base and the common point of the resistors 12, 22 and so on and of the capacitors 13, 23 and so on should consequently likewise exceed the width of the clock-pulse. Normally, the resistors 14, 24 and so on are constituted by the natural resistance of the base-electrode of the transistors 20, 30 and so on. If, however, this natural resistance is too low, it can be increased by a separate resistor, as shown in FIG. 3. Finally, the discharge time constant of the delaying network should exceed the time interval between two successive clock-pulses. In the circuit arrangement shown in FIG. 3, this means that the time constant equal to the product of the capacity of the capacitors 13, 23 and so on and the sum of the resistors 11 and 12, 21 and 22 and so on should exceed the time interval between the clock-pulse.

The circuit arrangement shown in FIG. 3 constitutes a shift register so that input pulses are transmitted or shifted one step at each pulse of a series of clock-pulses. In this case, the combination of each delay network and the next transistor constitutes a storage unit in which a pulse or a charge condition of the base-zone of the preceding transistor is stored during the time interval between two successive clock-pulses. The circuit arrangement as described consequently has the advanatge that only one transistor is used to store a given information during a clock-pulse interval and consequently only one series of clock-pulses need be supplied to the circuit.

What is claimed is:

1. A circuit arrangement comprising a plurality of transistors connected in cascade and acting as memory elements, each transistor having emitter, base and collector electrodes and exhibiting a collector cut-off voltage at which the current path from the emitter to the base electrode is at least partially cut off and each having a load impedance associated therewith, the emitter of each transistor being connected to a point of constant potential through its associated load impedance, a circuit connection comprising a delay network between the base of each transistor and the emitter of the preceding transistor, a source of voltage pulses connected to and simultaneously supplying the collector electrodes of all the transistors with voltage pulses having an amplitude greater than said collector cut-off voltage, whereby electrical energy is stored in a corresponding delay network upon the production of a voltage pulse through the load impedance of a transistor, said electrical energy producing a substantial number of free charge carriers in the base-zone of the succeeding transistor after termination of said voltage pulse.

2. A circuit arrangement as claimed in claim 1, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

3. A circuit arrangement as claimed in claim 1, said delay network being connected to the base of the succeeding transistor through a connecting resistor, said connecting resistor having a value such that the charging time of the base is long relative to the duration of the voltage pulses and short relative to the repetition frequency of the voltage pulses.

4. A circuit arrangement as claimed in claim 3, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

5. A circuit arrangement as claimed in claim 1, wherein said delay network comprises a series resistor and a capacitor, said series resistor connecting in series the emitter electrode of the preceding transistor to the base electrode of the succeeding transistor, and said capacitor connecting said base electrode to a point of constant potential.

6. A circuit arrangement as claimed in claim 5, said delay network being connected to the base of the succeeding transistor through a connecting resistor, said connecting resistor having a value such that the charging time of the base is long relative to the duration of the voltage pulses and short relative to the repetition frequency of the voltage pulses.

7. A circuit arrangement as claimed in claim 6, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

8. A circuit arrangement as claimed in claim 5, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

9. A circuit arrangement as claimed in claim 5, wherein the value of said series resistors is low relative to the value of said load impedance, whereby the charging time of said capacitor through said series resistor is short relative to the duration of said voltage pulses and its discharge time through the series resistor and load impedance is long relative to the repetition frequency of said voltage pulses.

10. A circuit arrangement as claimed in claim 9, said delay network being connected to the base of the succeeding transistor through a connecting resistor, said connecting resistor having a value such that the charging time of the base is long relative to the duration of the voltage pulses and short relative to the repetition frequency of the voltage pulses.

11. A circuit arrangement as claimed in claim 10, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

12. A circuit arrangement as claimed in claim 9, further comprising a rectifying element connected in series with said source of voltage pulses in the common supply for the transistor collectors, the polarity of said rectifying element being such that the charge in the base-zone of each transistor is prevented from being discharged between each of said voltage pulses by a forward base-collector leakage current.

13. A circuit arrangement comprising a plurality of deep etched transistors connected in cascade and acting as memory elements each transistor having emitter, base and collector electrodes and exhibiting a collector cut-off voltage at which the current path from the emitter to the base electrode is at least partially cut off and each having a load impedance associated therewith, the emitter of each transistor being connected to a point of constant potential through its associated load impedance, a circuit connection comprising a delay network between the base of each transistor and the emitter of the preceding transistor, a source of voltage pulses connected to and simultaneously supplying the collector electrodes of all the transistors with voltage pulses having an amplitude greater than said collector cut-off voltage whereby electrical energy is stored in a corresponding delay network upon the production of a voltage pulse through the load impedance of a transistor, said electrical energy producing a substantial number of free charge carriers in the base-zone of the succeeding transistor after termination of said voltage pulse.

References Cited in the file of this patent

UNITED STATES PATENTS 2,877,357 Pearshall et al. ---------- Mar. 10, 1959

FOREIGN PATENTS 763,734 Great Britain ---------- Dec. 19, 1956